US 8,750,360 B2

(12) United States Patent
Kent et al.

(10) Patent No.: US 8,750,360 B2
(45) Date of Patent: Jun. 10, 2014

(54) METHOD AND SYSTEM FOR PROCESSING MULTIPATH SIGNALS OVER A SINGLE USER DOWNLINK MIMO CHANNEL USING A HYBRID EQUALIZER/RAKE RECEIVER

(75) Inventors: Mark Kent, Vista, CA (US); Vinko Erceg, Cardiff, CA (US)

(73) Assignee: Broadcom Corporation, Irvine, CA (US)

( * ) Notice: Subject to any disclaimer, the term of this patent is extended or adjusted under 35 U.S.C. 154(b) by 887 days.

(21) Appl. No.: 12/765,635

(22) Filed: Apr. 22, 2010

(65) Prior Publication Data

US 2011/0150070 A1 Jun. 23, 2011

Related U.S. Application Data

(60) Provisional application No. 61/288,252, filed on Dec. 18, 2009.

(51) Int. Cl.
*H03H 7/30* (2006.01)
*H03H 7/40* (2006.01)
*H03K 5/159* (2006.01)

(52) U.S. Cl.
USPC .......................................... 375/229; 375/347

(58) Field of Classification Search
USPC ................................................ 375/347, 229
See application file for complete search history.

(56) References Cited

U.S. PATENT DOCUMENTS

| 7,693,210 | B2 * | 4/2010 | Margetts et al. | 375/150 |
| 7,738,608 | B2 * | 6/2010 | Feher | 375/347 |
| 2001/0033614 | A1 * | 10/2001 | Hudson | 375/229 |
| 2008/0075209 | A1 * | 3/2008 | Li et al. | 375/347 |
| 2009/0274196 | A1 * | 11/2009 | Black et al. | 375/147 |

* cited by examiner

*Primary Examiner* — Shuwang Liu
*Assistant Examiner* — Nader Bolourchi
(74) *Attorney, Agent, or Firm* — Sterne, Kessler, Goldstein & Fox P.L.L.C.

(57) ABSTRACT

A mobile device comprises multiple receive antennas to receive spatially independent multipath signals from multiple transmit antennas located on a single base station. The mobile device concurrently generates a RAKE-based equivalent single path signal (RAKE ESPS) and an equalizer-based equivalent single path signal (equalizer ESPS) for the multipath signals received via each receive antenna. The generated RAKE ESPS or the generated equalizer ESPS is selected for channel decoding. Reference signal components are extracted from the multipath signals received to determine noise components, which is used to determine signal quality information of the generated RAKE ESPS and the generated equalizer ESPS. A final ESPS is selected from the generated RAKE ESPS and the generated equalizer ESPS based on the corresponding determined signal quality information. The selected final ESPS is diversity processed by combining signal components over the transmit/receive antennas. Transmission parameters are determined for channel decoding the combined signals.

20 Claims, 5 Drawing Sheets

METHOD AND SYSTEM FOR PROCESSING MULTIPATH SIGNALS OVER A SINGLE USER DOWNLINK MIMO CHANNEL USING A HYBRID EQUALIZER/RAKE RECEIVER

CROSS-REFERENCE TO RELATED APPLICATIONS/INCORPORATION BY REFERENCE

This patent application makes reference to, claims priority to and claims the benefit from U.S. Provisional Patent Application Ser. No. 61/288,252 filed on Dec. 18, 2009.

This application makes reference to:
U.S. application Ser. No. 11/173,870 filed on Jun. 30, 2005; and
U.S. application Ser. No. 11/387,340 filed on Mar. 23, 2006.

Each of the above stated applications is hereby incorporated herein by reference in its entirety.

FIELD OF THE INVENTION

Certain embodiments of the invention relate to signal processing for communication systems. More specifically, certain embodiments of the invention relate to a method and system for processing multipath signals over a single user downlink MIMO channel using a hybrid equalizer/RAKE receiver.

BACKGROUND OF THE INVENTION

Wireless communication systems are widely deployed to provide various types of communications such as voice and data for a number of associated users. These systems may be implemented based on various access techniques such as, for example, code division multiple access (CDMA), time division multiple access (TDMA), frequency division multiple access (FDMA), or some other multiple access techniques to transmit and/or receive data traffic over communication channels such as, for example, Multiple-Input-Multiple-Output (MIMO) channels. MIMO-based wireless communication systems have received significant attention in the last years as a means to achieve a significantly increased capacity through spatial multiplexing. A MIMO communication system employs multiple transmit ($N_T$) antennas and multiple receive ($N_R$) antennas for communicating multiple spatially independent data streams. In an exemplary MIMO downlink communication system, the transmitter (e.g., a base station) is provided with multiple transmit antennas capable of transmitting multiple spatially independent data streams, while the receiver (e.g., a mobile device) is equipped with multiple receive antennas to receive one or more of the multiple spatially independent data streams transmitted by the base station. A MIMO channel is formed by multiple transmit ($N_T$) antennas and multiple receive ($N_R$) antennas. A connection from a multiple-antenna base station with multiple transmit ($N_T$) antennas to a single multiple-antenna mobile device with multiple receive ($N_R$) antennas is called a single user downlink MIMO channel. The single user downlink MIMO channel may be decomposed into $N_C$ independent channels, with $N_C \leq \min\{N_T, N_R\}$. Each of the $N_C$ independent channels is referred to as a spatial subchannel of the single user downlink MIMO channel. A communication channel such as a single user downlink MIMO channel is characterized by fluctuating signal levels and additive interference from in-cell and outer-cells. Signals transmitted over the single user downlink MIMO channel exhibit Inter-Path Interference (IPI) and fading, which directly affect the communicated signals and result in time-varying signal quality such as varying signal to interference plus noise power ratio (SINR). Special means such as, for example, error-correcting codes, power control and/or transmit-receive diversity may be utilized so as to combat these effects and provide reliable communications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for processing multipath signals over a single user downlink MIMO channel using a hybrid equalizer/RAKE receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for processing multipath signals over a single user downlink MIMO channel using a hybrid equalizer/RAKE receiver. In various embodiments of the invention, a mobile device comprising multiple receive antennas to be utilized to receive a plurality of spatially independent multipath signals from multiple transmit antennas located on a single base station. The mobile device is operable to concurrently generate an equivalent single path signal (ESPS) via a RAKE filter and an equivalent single path signal via an equalizer filter, respectively, for the multipath signals received by each of the multiple receive antennas. One of the generated RAKE-based equivalent single path signal (RAKE ESPS) and the generated equalizer-based equivalent single path signal (equalizer ESPS) is selected with respect to each of the multiple receive antennas for channel decoding. The mobile device is operable to extract reference signal components such as, for example, dedicated and/or common pilot signal components from the multipath signals received by each of the multiple receive antennas. Noise components in the multipath signals received by each of the multiple receive antennas may be calculated or determined using the extracted reference signal components.

Signal quality information of the generated RAKE-based equivalent single path signal and the generated equalizer-based equivalent single path signal is determined based on the determined noise components. The mobile device is operable to select either the generated RAKE-based equivalent single path signal or the generated equalizer-based equivalent single path signal for channel decoding based on the corresponding determined signal quality information. The mobile device is operable to perform diversity processing on the selected RAKE-based equivalent single path signal or the selected equalizer-based equivalent single path signal. In this regard, signal components, transmitted from the multiple transmit antennas located on the single base station, in the selected RAKE-based equivalent single path signal or the selected equalizer-based equivalent single path signal, are combined. Subsequently, signal components, received via the multiple receive antennas of the mobile device, in the selected RAKE-based equivalent single path signal or the selected equalizer-based equivalent single path signal, are also combined. The transmission parameters for the received multipath signals are determined using the resulting combined signal components. The determined transmission parameters may be utilized to channel decode the resulting combined signal components.

Figure 1:
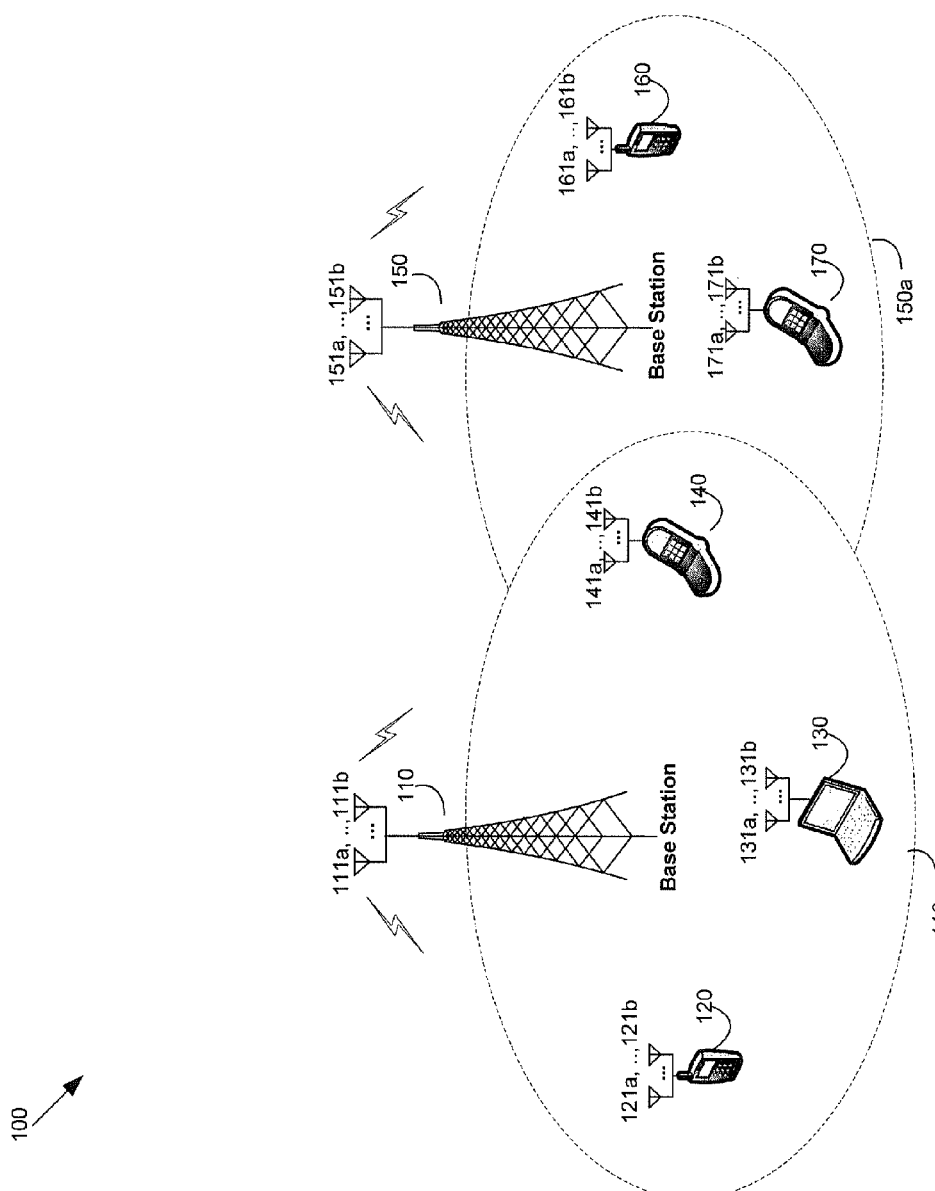
FIG. 1 is a diagram of an exemplary multiple-input-multiple-output (MIMO) communication system that is operable to process multipath signals received over a single user downlink MIMO channel using a hybrid equalizer/RAKE receiver, in accordance with an embodiment of the invention.

FIG. 1 is a diagram of an exemplary multiple-input-multiple-output (MIMO) communication system that is operable to process multipath signals received over a single user downlink MIMO channel using a hybrid equalizer/RAKE receiver, in accordance with an embodiment of the invention. Referring to FIG. 1, there is shown a MIMO communication system 100. The MIMO communication system 100 comprises cells 110a and 150a.

The cell 110a comprises a base station 110 and a plurality of associated mobile devices, of which mobile devices 120-140 are illustrated. The cell 150a comprises a base station 150 and a plurality of associated mobile devices, of which mobile devices 160-170 are displayed. The cells 110a-150a comprises geographical areas covered by the base station 110 and the base station 150, respectively.

A base station such as the base station 110 may comprise suitable logic, circuitry, interfaces and/or code that may be operable to perform air interface processing and schedule communication resources such as spectrum and/or time slots in both uplink communications and downlink communications to various associated mobile devices such as the mobile device 120 in a timely manner. The base station 110 may be operable to determine which associated mobile device may receive a data packet and at what time the receiving should occur. In various embodiments of the invention, there may be concurrent communication between the base station 110 and a plurality of associated mobile devices such as the mobile devices 120-140. In this regard, base station 110 may be operable to employ multiple available transmit antennas, for example, the transmit antennas 111a-111b, to communicate multiple spatially independent data streams with one or more multi-antenna mobile devices such as the mobile devices 120-140. Multiple spatially independent data streams may be communicated by the base station 110 over one or more single user downlink MIMO channels.

A single user downlink MIMO channel is formed by multiple transmit antennas located on the same base station such as the base station 110 and multiple receive antennas on a single mobile device such as the mobile device 120. For example, in instances where the base station 110 may be operable to utilize M available transmit antennas to transmit multiple spatially independent data streams to, for example, N receive antennas at the mobile device 120, a single user downlink MIMO channel between the base station 110 and the mobile device 120 comprises M×N spatial subchannels. M×N spatially independent data streams may be transmitted to the mobile device 120 over the single user downlink MIMO channel. Due to channel fading and/or additive interference from in-cell (the cell 110a) and/or outer-cells such as the cell 150a, each transmitted data stream may reach a receive antenna by two or more paths (time delays) resulting a time varying signal quality.

A multi-antenna mobile device such as the mobile device 120 may comprise suitable logic, circuitry and/or code that may be operable to communicate with a wireless communication network such as a WCDMA network and/or a HSDPA network via an associated serving base station such as the base station 110. The mobile device 120 may be operable to employ multiple available receive antennas, for example, the receive antennas 121a-121b, to concurrently receive multiple spatially independent data streams from the base station 110. Each data stream transmitted from the base station 110 may arrive at a receive antenna in two or more time delays caused by fading and/or interference effects in a corresponding spatial subchannel of an associated single user downlink MIMO channel. Multipath components or signals may be received for each transmitted data stream, and may be combined destructively to yield a substantial reduction in signal quality such as signal-to-noise ratio (SNR). In this regard, the received multipath signals for each transmitted data stream may be processed using various means such as, for example, a Rake reception and/or a multipath equalization so as to mitigate the degradation in performance caused by channel fading and/or interference effects.

During the RAKE reception, a separate correlator is dedicated to each arriving multipath signal, namely, a finger of a RAKE reception. The multipath signals over the entire fingers in the RAKE reception are combined to reconstruct or generate an equivalent single path signal, namely, a RAKE-based single path signal, corresponding to a transmitted data stream for demodulation. In the multipath equalization, arriving multipath signals of a transmitted data stream may be compensated for average range of expected channel amplitude and delay characteristics. The resulting compensated multipath signals are combined over the entire delay paths to reconstruct or generate an equivalent single path signal, namely, an equalizer-based equivalent single path signal, corresponding to the transmitted data stream for demodulation. The RAKE reception may be severely limited by self- and/or multiple-access interferences through multipath propagation. However, the RAKE reception is beneficial from multipath diversity and provides a stable multipath solution, that is, the generated RAKE-based equivalent single path signal, for an environment with a small multipath delay spread with respect to the bandwidth inverse of the transmitted data stream. The multipath equalization adequately takes into account various interferences such as, for example, self- and/or multiple-access interference to provide a stable multipath solution, that is, the generated equalizer-based equivalent single path signal, for an environment with a large multipath delay spread with respect to the bandwidth inverse of the transmitted data stream. In this regard, the mobile device 120 may be operable to process the received multipath signals of a corresponding transmitted data stream using a hybrid equalizer/RAKE scheme.

The mobile device 120 may be operable to concurrently compute an equalizer-based equivalent single path signal and a RAKE-based equivalent single path signal for the received multipath signals of the corresponding transmitted data stream. A final equivalent single path signal for the received multipath signals may be selected by the mobile device 120 from the computed equalizer-based equivalent single path signal and the computed RAKE-based equivalent single path signal for the received multipath signals of the corresponding transmitted data stream. Signal quality as specified by parameters such as SNR of the computed equalizer-based equivalent single path signal and the computed RAKE-based equivalent single path signal may be considered, respectively, for the selection of the final equivalent single path signal for the received multipath signals. The selected final equivalent single path signal may be demodulated via various processes such as, for example, a diversity process by combining signals transmitted from multiple transmit antennas located on the same base station to the mobile device 120. The resulting signals may be further processed by combining signal components received via multiple receive antennas on the mobile device 120. The diversity processed signals may be channel decoded to support corresponding applications.

In an exemplary operation, a multi-antenna base station such as the base station 110 may be operable to concurrently communicate with a plurality of associated multi-antenna mobile devices such as the mobile devices 120-140. The base station 110 may be operable to communicate multiple spatially independent data streams using multiple available transmit antennas such as the transmit antennas 111a-111b to the mobile devices 120-140. A transmitted data stream may arrive at a receive antenna such as the receive antenna 121a in two or more time delays due to channel fading and/or interference effects. The mobile device 120 may be operable to process the received multipath signals to reconstruct the transmitted data stream using a hybrid equalizer/RAKE scheme. In this regard, an equalizer-based equivalent single path signal and a RAKE-based equivalent single path signal may be concurrently generated for the received multipath signals of the transmitted data stream. Signal quality of the generated equalizer-based equivalent single path signal and the generated RAKE-based equivalent single path signal may be evaluated.

The mobile device 120 may be operable to select a final equivalent single path signal for the received multipath signals, which corresponds to higher signal quality such as SNR, from the computed equalizer-based equivalent single path signal and the computed RAKE-based equivalent single path signal for the received multipath signals of the transmitted data stream. The mobile device 120 may be operable to demodulate the selected final equivalent single path signal using various processes such as, for example, a diversity process to combine signals transmitted from multiple transmit antennas located on the same base station such as the base station to the mobile device 120. The resulting combined signals may be processed by combining signal components received via multiple receive antennas on the mobile device 120. The combined signal may be channel decoded for corresponding applications.

Figure 2:
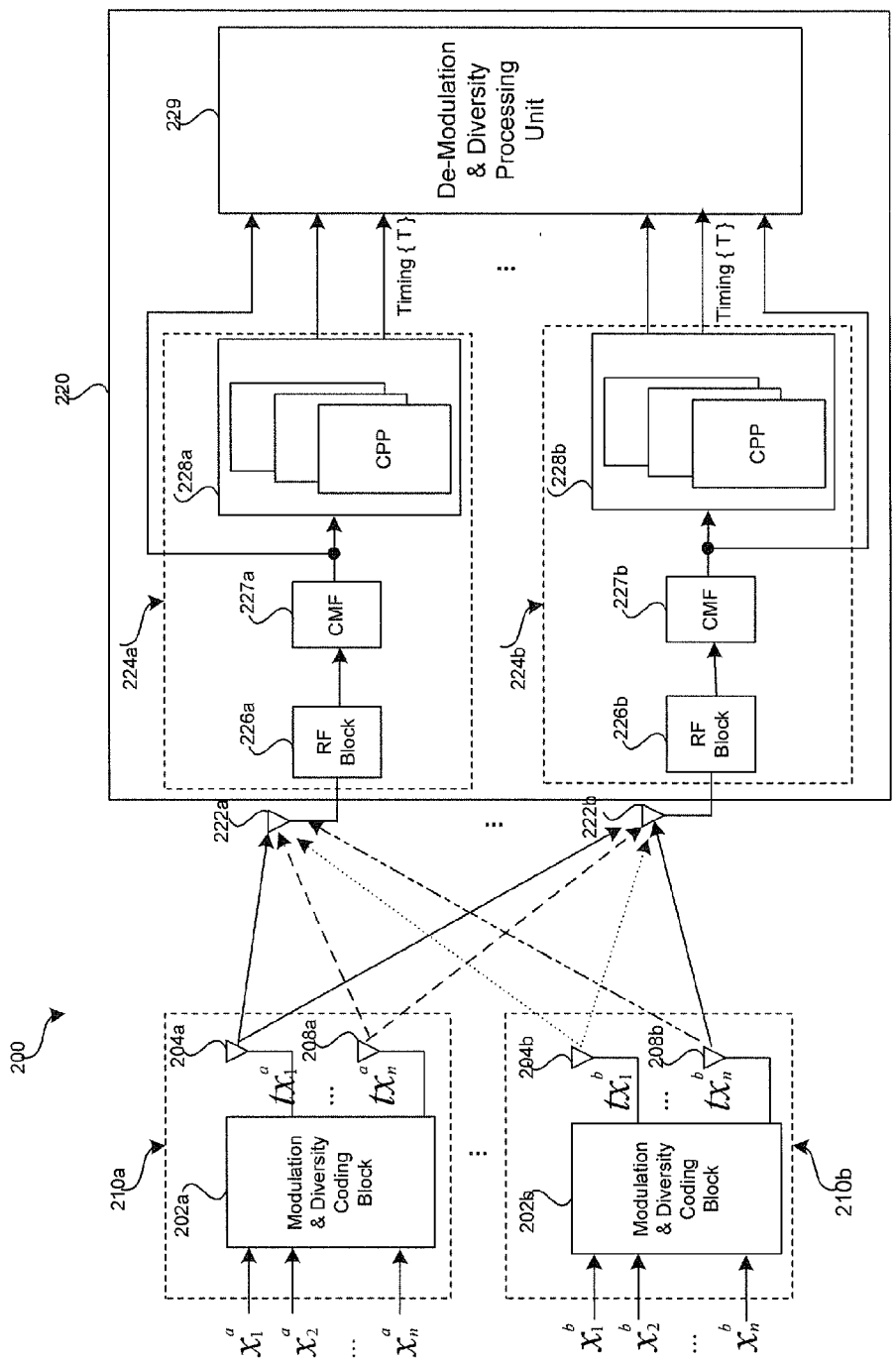
FIG. 2 is a block diagram illustrating an exemplary MIMO downlink WCDMA transmission system that is operable to process multipath signals received over a single user downlink MIMO channel using a hybrid equalizer/RAKE receiver, in accordance with an embodiment of the invention.

FIG. 2 is a block diagram illustrating an exemplary MIMO downlink WCDMA transmission system that is operable to process multipath signals received over a single user downlink MIMO channel using a hybrid equalizer/RAKE receiver, in accordance with an embodiment of the invention. Referring to FIG. 2, there is shown a MIMO downlink communication system 200 comprising a plurality base stations, of which base stations 210a-210b are illustrated, and a mobile device 220.

On the transmission side, the base station 210a comprises a modulation and diversity coding block 202a and a plurality of transmit antennas 204a-208a. The base station 210b comprises a modulation and diversity coding block 202b and a plurality of transmit antennas 204b-208b.

A transmit antenna such as the transmit antenna 204a may comprise suitable logic, circuitry, interfaces and/or code that may be operable to transmit a spatially independent data stream. The transmit antenna 204a may be scheduled and/or assigned to transmit a spatially independent data stream to receive antennas of selected mobile devices. In this regard, the transmit antenna 204a may be operable to transmit a spatially independent data stream over a plurality of spatial subchannels associated with a single user downlink MIMO channel between the base station 210a and the mobile device 220. For example, the transmit antenna 204a may be operable to transmit a spatially independent data stream over spatial subchannels between the transmit antenna 204a and each of the receive antennas 222a-222b of the mobile device 220, respectively.

A modulation and diversity coding block such as the modulation and diversity coding block 202a may comprise suitable logic, circuitry, interfaces and/or code that may be adapted to receive inputs, for example, $X_1^a, X_2^a, \ldots, X_n^a$, to generate modulated signals $tX_1^a, \ldots, tX_n^a$. The modulated signals $tX_1^a, \ldots, tX_n^a$ may be processed and separated into multiple spatially independent data streams for transmission. In instances where the base station 210a may be equipped with, for example, M available transmit antennas, where M is an integer and M>1, the modulation and diversity coding block 202a may be operable to separate the processed modulated signals $tX_1^a, \ldots, tX_n^a$ into at most M different spatially independent signals. In instances where an intended mobile device (receiver) such as the mobile device 220 may be equipped with, for example, N receive antennas, where N is an integer and N>1, a single user downlink MIMO channel between the base station 210a and the mobile device 220 may comprise at most M×N spatial subchannels. The modulation and diversity coding block 202a may be operable to transmit to at most M spatially independent data streams over the single user downlink MIMO channel comprising M×N spatial subchannels at a time.

On the reception side, the mobile device 220 comprises a plurality of multipath processor (MPP) 224a-224b and a demodulation and diversity processing unit 229. Each MPP comprises a receive antenna such as receive antennas 222a-222b, a radio frequency (RE) block such as RF blocks 226a-226b, a chip matching filter (CMF) such as CMF 227a-227b, a cluster path processor (CPP) such as CPPs 228a-228b.

A receive antenna such as the receive antenna 222a may comprise suitable logic, circuitry, interfaces and/or code that may be operable to receive multiple spatially independent data streams. The receive antenna 222a may be scheduled and/or assigned to receive multiple spatially independent data streams from multiple available transmit antennas of, for example, the base station 210a. In this regard, the receive antenna 222a may be operable to receive multiple spatially independent data streams over multiple spatial subchannels of a single user downlink MIMO channel between the base station 210 and the mobile device 220.

A RF block such as the RF block 226a may comprise suitable logic, circuitry, interfaces and/or code that may be operable to amplify and convert the analog RF signal, received by the receive antenna 222a, down to a corresponding analog baseband signal. The RF block 226a may be operable to convert the analog baseband signal to a corresponding digital baseband signal. The RF block 226a may be operable to communicate the digital baseband signal with the CMF 227a.

A CMF such as the CMF 227a may comprise suitable logic, circuitry, interfaces and/or code that may be operable to filter the digital baseband signal from the RF block 226a and to produce complex in-phase and quadrature components (I, Q) of the filtered signal. In this regard, the CMF 227a may be operable to filter the resulting I and Q components to within, for example, the 3.84 MHz bandwidth of W-CDMA baseband.

A CPP such as the CPP 228a may comprise suitable logic, circuitry, interfaces and/or code that may be operable to allocate a finger to each of the delay paths so as to track multipath signals received over different multipaths. Each allocated finger may be configured to process a signal received over a specific channel at different path delays. In this regard, the CPP 228a may be operable to allocate a finger to process signals received, over each spatial subchannel between multiple transmit antennas such as the transmit antennas 204a-208a and the receive antenna 222a. The position of the allocated finger may provide a timing reference signal, T, which tracks a time delay of a received multipath signal. The CPP 228a may be configured to concurrently process a signal transmitted by multiple transmit antennas located on the same base station, for example, the transmit antennas 204a-208a of the base station 210a. The configurations in which a receiving antenna such as the receive antenna 222a receives signals from multiple transmit antennas is described as "receiving modes" in the W-CDMA standard. These receiving modes may comprise closed loop 1 (CL1), close loop 2 (CL2), and space time transmit diversity (STTD). The CPP 228a may be operable to assign fingers on a per base station basis.

The de-modulation and diversity processing unit 229 may comprise suitable logic, circuitry, interfaces and/or code that may be operable to process multipath signals captured by the CPPs 228a-228b. In this regard, for each CPP, the de-modulation and diversity processing unit 229 may be operable to concurrently generate a RAKE-based equivalent single path signal and an equalizer-based equivalent single path signal for the captured multipath signals. The de-modulation and diversity processing unit 229 may be operable to evaluate the signal quality of the generated RAKE-based equivalent single path signal and the generated equalizer-based equivalent single path signal so as to select a final equivalent single path signal for decoding. The selected final equivalent single path signal may be despreaded. The de-modulation and diversity processing unit 229 may be operable to diversity process the despreaded multipath signals by combining multipath components transmitted from different transmit antennas located on the same base station such as the base station 210a and multipath components received via multiple receive antennas on the mobile device 220. The resulting diversity processed signal may be decoded to generate channel decoded signals.

Although a MIMO downlink WCDMA transmission system is illustrated in FIG. 2, the invention may not be so limited. Accordingly, other MIMO downlink transmission systems such as a MIMO downlink HSDPA transmission system may be utilized for transmitting downlink signals without departing from the spirit and scope of various embodiments of the invention.

In an exemplary operation, a plurality of signals to be transmitted may be modulated via the modulation and diversity coding block 202a, for example. The modulated signals may be separated into multiple spatially independent data streams for transmission. The transmit antennas 204a-208a may be configured to transmit the multiple spatially independent data streams. In instances where a mobile device (receiver) such as the mobile device 220 may be selected to receive at least a portion of the multiple spatially independent data streams, each of the receive antennas 222a-222b may be scheduled and/or assigned to receive spatially independent data streams from available transmit antennas of the base station 210a. Data streams received, for example, via the receive antenna 222a, may be amplified and converted into corresponding digital baseband signals. The digital baseband signals may be filtered by the CMF 227 to generate I and Q components to within, for example, the 3.84 MHz bandwidth of W-CDMA baseband. Multipath components of the output of the CMF 227 may be captured via the CPP 228a.

The CPP 228a may be configured to process signal components transmitted by multiple transmit antennas located on the same base station, for example, the transmit antennas 204a-208a of the base station 210a. Fingers may be allocated by the CPP 228a to process signals received, over each spatial subchannel between each of available transmit antennas such as the transmit antennas 204a-208a and the receive antenna 222a. The processed signals from the allocated fingers may be communicated with the de-modulation and diversity processing unit 229 for further process. For each multipath processing path such as the MPP 224a, the de-modulation and diversity processing unit 229 may be operable to concurrently generate a RAKE-based equivalent single path signal and an equalizer-based equivalent single path signal for the captured multipath signals. The generated RAKE-based or equalizer-based equivalent single path signal corresponding to a higher signal quality is selected as a final equivalent single path signal for the captured multipath signals. The selected final equivalent single path signal may be despreaded. Components in the despreaded signals from transmit antennas of the base station 210 may be combined. The resulting combined signals may further be processed by combining signal components received via multiple receive antennas on the mobile device 220. The combined signals may be decoded to support a corresponding application.

Figure 3:
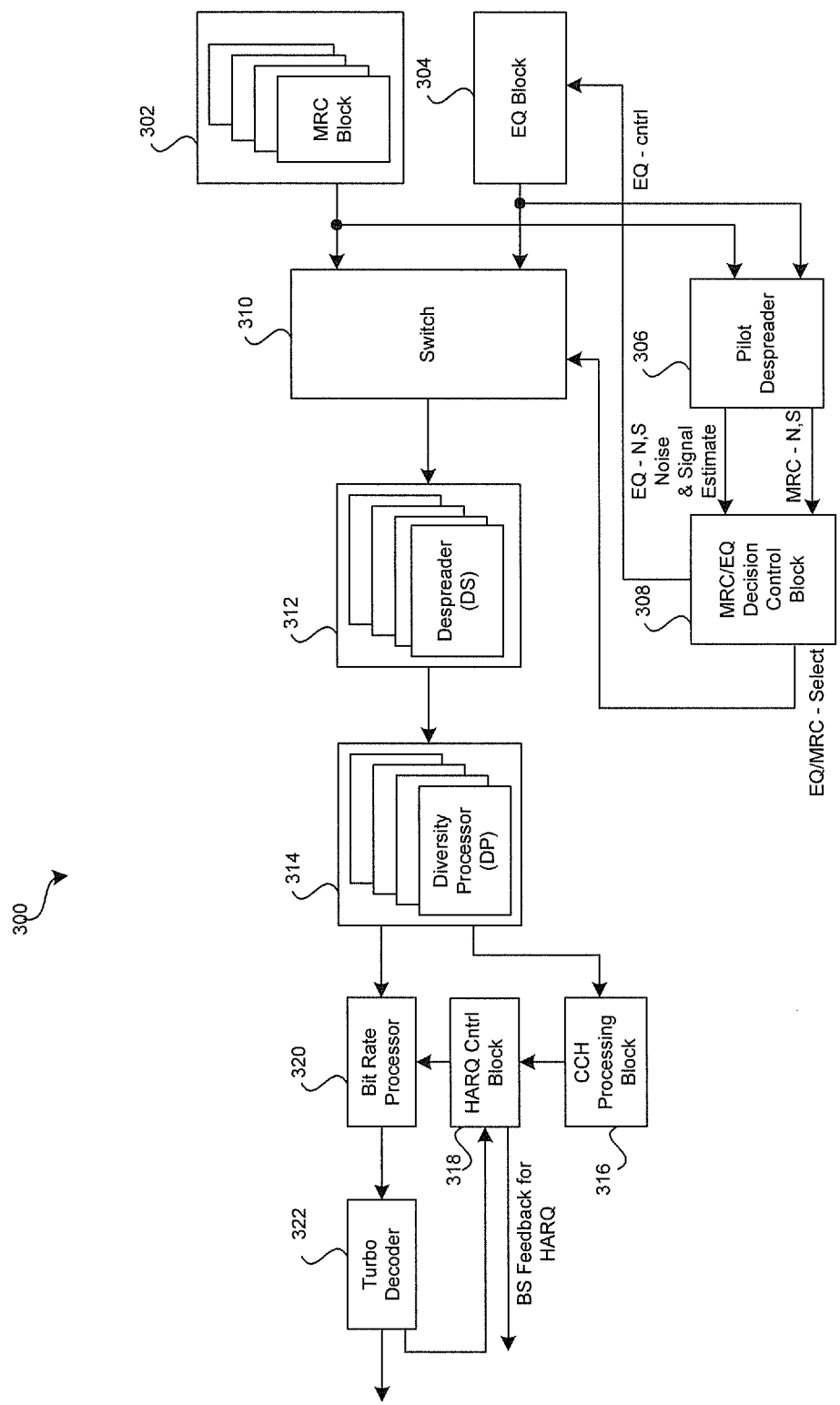
FIG. 3 is a block diagram illustrating an exemplary hybrid equalizer/RAKE receiver that is operable to process multipath signals received over a single user downlink MIMO channel, in accordance with an embodiment of the invention.

FIG. 3 is a block diagram illustrating an exemplary hybrid equalizer/RAKE receiver that is operable to process multipath signals received over a single user downlink MIMO channel, in accordance with an embodiment of the invention. Referring to FIG. 3, there is shown a hybrid equalizer/RAKE receiver 300. The hybrid equalizer/RAKE receiver 300 comprises a maximum ratio combiner (MRC) 302, an equalizer (EQ) 304, a pilot despreader 306, a MRC/EQ decision control 308, a switch 310, a despreader 312, a diversity processor (DP) 314, a CCH processing block 316, a HARQ control (Cntrl) block 318, a bit rate processor 320, and a Turbo decoder 322.

It may be assumed that a base station such as the base station 210a may be operable to utilize M available transmit antennas for downlink transmissions to an intended mobile device (receiver) such as the mobile device 220, where M is an integer and M>1. The mobile device 220 may be operable to utilize N available receive antennas to receive downlink transmissions from the base station 210a, where N is an integer and N>1. In instances where the mobile device 220 may be the kth user served by the base station 210a, where k is an integer, $1 \leq k \leq K$, and K is the total number of users served by the base station 210a. The channel impulse response matrix estimate, $h_k$, of the single user downlink MIMO channel between the base station 210a and the kth mobile device (the mobile device 220) may be expressed as following:

$$h_k = \begin{bmatrix} h_k(1,1) & h_k(1,2) & \ldots & h_k(1,M) \\ h_k(2,1) & h_k(2,2) & \ldots & h_k(2,M) \\ \ldots \\ h_k(M,1) & h_k(M,2) & \ldots & h_k(M,N) \end{bmatrix},$$

where $h_k(i,j)$, $(1 \leq i \leq M, 1 \leq j \leq N)$, is channel impulse response estimate vector for a spatial subchannel between the ith transmit antenna of the base station 210a and the jth receive antenna of the kth mobile device (the mobile device 220).

The received signal matrix, $r_k$, to the kth mobile device over the single user downlink MIMO channel $h_k$ may be expressed as following:

$$r_k = \begin{bmatrix} r_k(1,1) & r_k(1,2) & \ldots & r_k(1,M) \\ r_k(2,1) & r_k(2,2) & \ldots & r_k(2,M) \\ \ldots \\ r_k(M,1) & r_k(M,2) & \ldots & r_k(M,N) \end{bmatrix},$$

where $r_k(i,j)$, $(1 \leq i \leq M, 1 \leq j \leq N)$, is the input signal vector over the spatial subchannel $h_k(i,j)$ to the kth mobile device (the mobile device 220).

The MRC 302 may comprise suitable logic, circuitry, interfaces and/or code that may be operable to generate a RAKE-based equivalent single path signal for multipath signals $r_k(i,j)$, $(1 \leq i \leq M, 1 \leq j \leq N)$ captured via a corresponding CPP such as the CPP 228a. The RAKE-based equivalent single path signal may be generated by combining signals from each of allocated fingers of a corresponding CPP such as the CPP 228a using maximum ratio combining. Specifically, for multipath signals $r_k(i,j)$ received over the spatial subchannel $h_k(i,j)$, the MRC 302 may be operable to produce the RAKE-based equivalent single path signal for $r_k(i,j)$ by, for example, $$\sum_{\tau_l} r_k(i,j,\tau_l) h_k(i,j,\tau_l),$$

where $\tau_l$, $(0 \leq l \leq L)$ is a finger position (time delay) and L is the delay spread of the CPP 228a. The generated RAKE-based equivalent single path signal may be communicated with the switch 310 and the pilot despreader 306.

The EQ 304 may comprise suitable logic, circuitry, interfaces and/or code that may be operable to generate an equalizer-based equivalent single path signal for multipath signals captured via a corresponding CPP such as the CPP 228a. The equalizer-based equivalent single path signal may be generated by compensating multipath signals for average range of expected channel amplitude and delay characteristics. The generated equalizer-based equivalent single path signal may be communicated with the switch 310 and the pilot despreader 306.

The pilot despreader 306 may comprise suitable logic, circuitry, interfaces and/or code that may be operable to despread a reference signal such as a common pilot signal and/or a dedicated pilot signal associated with the multipath signals captured by the CPP 228a. The despreaded reference signal may be utilized to compute estimates for signal and noise components contained in the RAKE-based equivalent single path signal and the equalizer-based equivalent single path signal from the MRC 302 and the EQ block 304, respectively.

The MRC/EQ decision control block 308 may comprise suitable logic, circuitry, interfaces and/or code that may be operable to determine a final equivalent single path signal from the generated RAKE-based equivalent single path signal and the equalizer-based equivalent single path signal based on corresponding signal quality. The MRC/EQ decision control block 308 may be operable to evaluate signal quality such as SNR of the generated RAKE-based equivalent single path signal and the generated equalizer-based equivalent single path signal, respectively. One of the generated RAKE-based equivalent single path signal and the generated equalizer-based equivalent single path signal, which corresponds to higher signal quality, may be selected as the final equivalent single path signal. A control signal indication the selection of the final equivalent single path signal may be generated and communicated with the switch 310.

The switch 310 may comprise suitable logic, circuitry, interfaces and/or code that may be operable to adopt either the generate RAKE-based equivalent single path signal from the MRC block 302 or the generated equalizer-based equivalent single path signal from the EQ block 304 for further processing in the receiver 300 based on a control signal received from the MR/EQ decision control block 308.

The DS 312 may comprise suitable logic, circuitry, interfaces and/or code that may be operable to despread the selected final equivalent single path signal from the switch 310. The despreaded final equivalent single path signal may be communicated with the DP 314.

The DP 314 may comprise suitable logic, circuitry, interfaces and/or code that may be operable to perform diversity process on the despreaded final equivalent single path signal from the DS 312. The DP 314 may be operable to combine signal components transmitted from transmit antennas located on the same base station such as the base station 110a for channel decoding. The resulting combined signal components may further be processed by combining signal components received via multiple receive antennas on the mobile device 220.

The CCH processing block 316 may comprise suitable logic, circuitry, interfaces and/or code that may be operable to decode control channel information of the output signals of the DP 314.

The HARQ cntrl block 318 may comprise suitable logic, circuitry, interfaces and/or code that may be operable to perform hybrid automatic repeat request (HARQ) process to manage data transmission and retransmission of the output signals of the DP 314.

The bit rate processor 320 may comprise suitable logic, circuitry, interfaces and/or code that may be operable to perform rate matching on the output signals of the DP 314.

The Turbo decoder 322 may comprise suitable logic, circuitry, interfaces and/or code that may be operable to perform Turbo decoding on the rate-matched signals from the bit rate processor 320 using transmission control information provided from the CCH processing block 316.

In an exemplary operation, a plurality of multipath signals arrives at the mobile device 220 over, for example, a single user downlink MIMO channel between the base station 210a and the mobile device 220. For each multipath processor such as the MPP 224a, the de-modulation and diversity processing unit 300 may be operable to concurrently generate a RAKE-based equivalent single path signal via the MRC 302 and an equalizer-based equivalent single path signal via the EQ block 304 for multipath signals captured via the MPP 224a.

Signal and noise components in the generated RAKE-based equivalent single path signal and the generated equalizer-based equivalent single path signal are computed via the pilot despreader 306. The MRC/EQ decision control block 308 may be operable to determine a final equivalent single path signal from the generated RAKE-based equivalent single path signal and the equalizer-based equivalent single path signal based on corresponding signal quality. The MRC/EQ decision control block 308 may be operable to signal the switch 310 with the determined final equivalent single path signal.

The DS 312 may be operable to despread the determined final equivalent single path signal. Signal components transmitted from transmit antennas located on the same base station such as the base station 110a may be combined via the DP 314. Signal components received via receive antennas 222a-222b on the mobile device 220 may also be combined via the DP 314. Transmission control information from the base station 210a may be decoded via the CCH processing block 316 using, for example, pilot signal components in the output of the DP 314. The output of the DP 314 may be processed via the HARQ cntrl block 318 for data transmission and/or retransmission and rate-matched via the bit rate processor 320. The resulting rate-matched signal may be Turbo decoded via the Turbo decoder 322.

Figure 4:
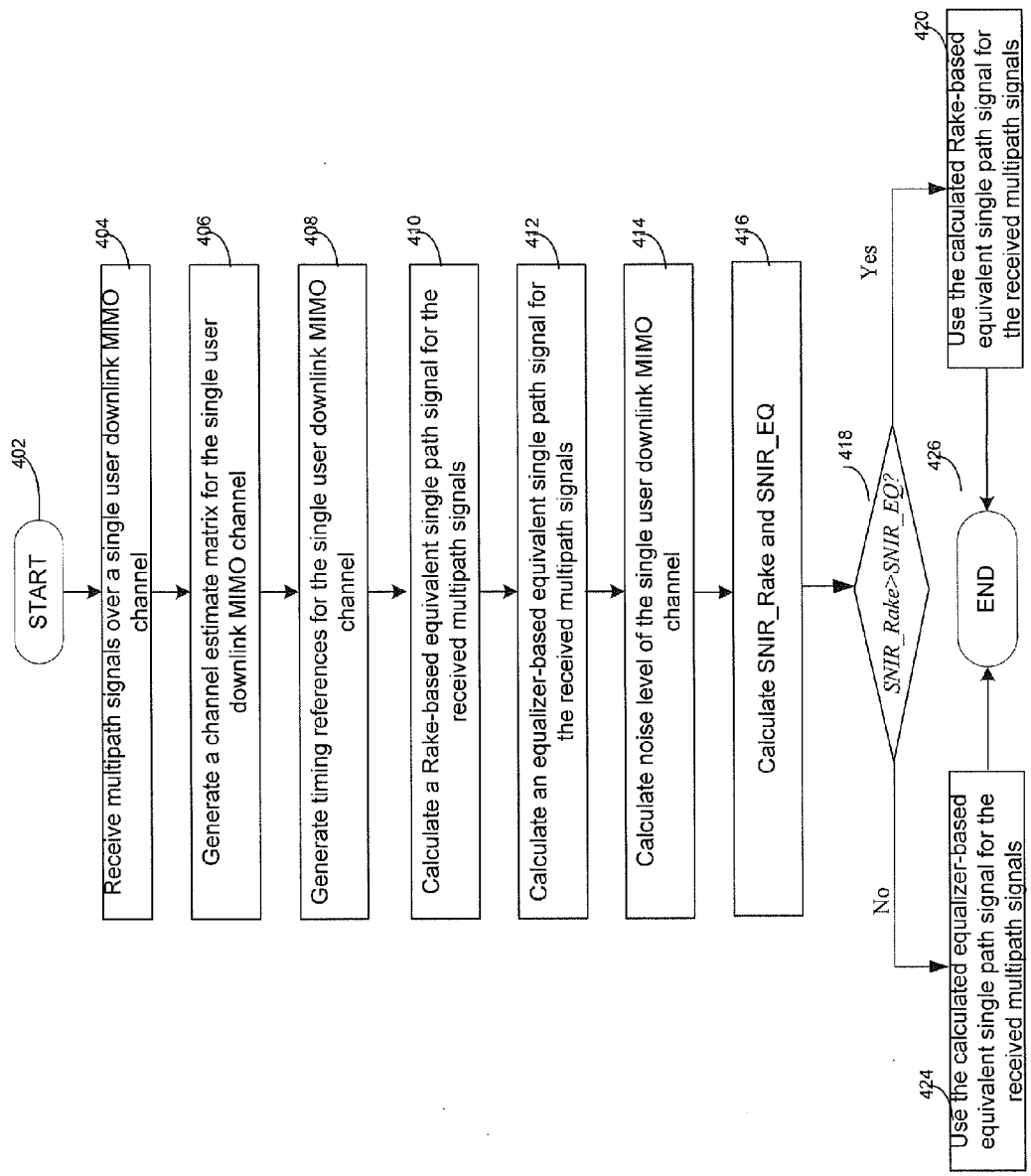
FIG. 4 is a flow diagram illustrating exemplary steps for selecting a hybrid equalizer/RAKE-based equivalent single path signal for multipath signals received over a single user downlink MIMO channel, in accordance with an embodiment of the invention.

FIG. 4 is a flow diagram illustrating exemplary steps for selecting a hybrid equalizer/RAKE-based equivalent single path signal for multipath signals received over a single user downlink MIMO channel, in accordance with an embodiment of the invention. Referring to FIG. 4, the exemplary steps start with step 402, a receiver such as the mobile device 220 may be equipped with multiple receive antennas such as the receive antennas 222a-222b to receive downlink transmissions from multiple available transmit antennas such as the transmit antennas 204a-208a of the base station 210a. In step 404, the mobile device 220 may be operable to received multipath signals over a single user downlink MIMO channel between the transmit antennas 204a-208a and receive antennas 222a-222b. In step 406, the mobile device 220 may be operable to generate a channel estimate matrix for the single user downlink MIMO channel using the received multipath signals. In step 408, the mobile device 220 may operable to generate timing references for each spatial subchannel of the single user downlink MIMO channel via the CPPs 228a-228b.

In step 410, the MRC 302 may be operable to calculate a RAKE-based equivalent single path signal for received multipath signals processed over each of the MPP 224a-224b. In step 412, the EQ block 304 may be operable to calculate an equalizer-based equivalent single path signal for received multipath signals processed over each of the MPP 224a-224b. In step 414, the pilot despreader 306 may be operable to calculate noise level of the single user downlink MIMO channel using pilot components of the received multipath signals. In step 416, the signal quality such as SINR or SNR for the generated RAKE-based equivalent single path signal and the generated equalizer-based equivalent single path signal may be calculated. In step 418, it may be determined that whether the calculated SINR or SNR for the generated RAKE-based equivalent single path signal is greater than the calculated SINR or SNR for the generated equalizer-based equivalent single path signal. In instances where the calculated SINR or SNR for the generated RAKE-based equivalent single path signal is greater than the calculated SINR or SNR for the generated equalizer-based equivalent single path signal, exemplary steps proceed to step 420. In step 420, the mobile device 220 may be configured to use the generated RAKE-based equivalent single path signal as the final equivalent single path signal for the received multipath signals. The exemplary steps may end in step 426.

In step 418, in instances where the calculated SINR or SNR for the generated RAKE-based equivalent single path signal is less than the calculated SINR or SNR for the generated equalizer-based equivalent single path signal, then in step 424. In step 424, the mobile device 220 may be configured to use the generated equalizer-based equivalent single path signal as the final equivalent single path signal for the received multipath signals. The exemplary steps may end in step 426.

Figure 5:
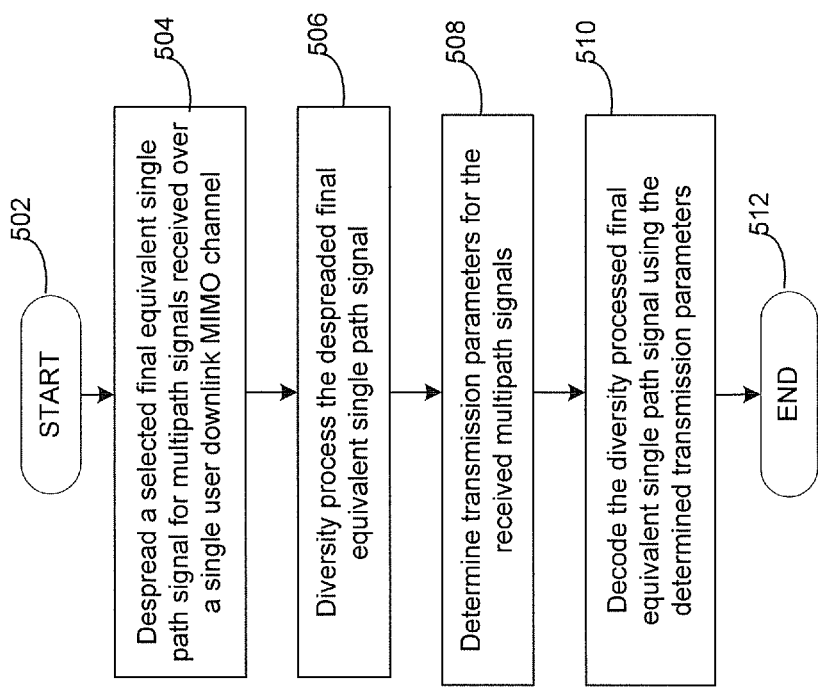
FIG. 5 is a flow chart illustrating exemplary steps for processing multipath signals received over a single user downlink MIMO channel using a hybrid equalizer/RAKE receiver, in accordance with an embodiment of the invention.

FIG. 5 is a flow chart illustrating exemplary steps for processing multipath signals received over a single user downlink MIMO channel using a hybrid equalizer/RAKE receiver, in accordance with an embodiment of the invention. Referring to FIG. 5, the exemplary steps start with step 502, a receiver such as the mobile device 220 may be equipped with multiple receive antennas such as the receive antennas 222a-222b to receive downlink transmissions from multiple available transmit antennas such as the transmit antennas 204a-208a of the base station 210a. The mobile device 220 may be operable to determine a final equivalent single path signal for received multipath signals from the base station 210. The determined final equivalent single path signal is a hybrid equalizer/RAKE-based equivalent single path signal. In step 404, is may be assumed that the received multipath signals comprise WCDMA signals. The mobile device 220 may be operable to despread the hybrid equalizer/RAKE-based equivalent single path signal via the DS 312. In step 506, the DP 314 may be operable to perform diversity processing by combining signal components from transmit antennas located on the same base station such as the base station 210a as well as signal components received via multiple receive antennas on the mobile device 220. In step 508, the transmission parameters for the received multipath signals may be determined via the CCH processing block 316. In step 510, the diversity processed hybrid equalizer/RAKE-based equivalent single path signal may be decoded using the determined transmission parameters. The exemplary steps may end in step 512.

Exemplary aspects of a method and system for processing multipath signals over a single user downlink MIMO channel using a hybrid equalizer/RAKE receiver device are provided. In accordance with various embodiments of the invention, a communication device such as the mobile device 220 is equipped with multiple receive antennas such as the receive antennas 222a-222b. The mobile device 222 may be operable to utilize the receive antenna 222a-222b to receive a plurality of spatially independent multipath signals from two or more transmit antennas such as the transmit antennas 204a-208a located on a single base station such as the base station 210a. The mobile device 220 may be operable to concurrently generate a RAKE-based equivalent single path signal and an equalizer-based equivalent single path signal for the multipath signals received by each of the two or more receive antennas such as the receive antennas 222a-222b. One of the generated RAKE-based equivalent single path signal and the generated equalizer-based equivalent single path signal may be selected with respect to each of the two or more receive antennas such as the receive antennas 222a-222b for channel decoding. The mobile device 220 may be operable to extract reference signal components such as, for example, dedicated pilot signal components and/or common pilot signal components for WCDMA signals, from the multipath signals received by each of the receive antennas 222a-222b. The pilot despreader 306 may be operable to determine or calculate noise components in the multipath signals received by each of the receive antennas 222a-222b using the extracted reference signal components. Signal quality information of the generated RAKE-based equivalent single path signal and the generated equalizer-based equivalent single path signal may be determined based on the determined noise components. The MRC/EQ decision control block 308 may be operable to select a final equivalent single path signal from the generated RAKE-based equivalent single path signal and the generated equalizer-based equivalent single path signal for channel decoding based on the corresponding determined signal quality information. The DP 314 may be operable to perform diversity processing on the selected final equivalent single path signal. In this regard, signal components, transmitted from the transmit antennas 204a-208a located on the single base station such as the base station 210a, in the selected final equivalent single path signal may be combined. Subsequently, signal components, received via the receive antennas 222a-222b of the mobile device 220, in the selected final equivalent single path signal may be combined. The transmission parameters for the received multipath signals may be determined via the CCH processing block 316 from the resulting combined signals. The determined transmission parameters may be utilized to channel decode such as Turbo decode the resulting combined signals from the DP 314.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for processing multipath signals over a single user downlink MIMO channel using a hybrid equalizer/RAKE receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
   in a mobile communication device comprising a plurality of receive antennas:
   receiving spatially independent multipath signals via said plurality of receive antennas from a plurality of transmit antennas located on a single base station;
   concurrently generating a RAKE-based equivalent single path signal and an equalizer-based equivalent single path signal for said spatially independent multipath signals received by each of said plurality of receive antennas;
   selecting one of said generated RAKE-based equivalent single path signal and said generated equalizer-based equivalent single path signal with respect to said each of said plurality of receive antennas for channel decoding; and
   despreading said selected RAKE-based equivalent single path signal or said selected equalizer-based equivalent single path signal.

2. The method according to claim 1, further comprising extracting reference signal components from said spatially independent multipath signals received by each of said plurality of receive antennas.

3. The method according to claim 2, further comprising determining noise components in said spatially independent multipath signals received by each of said plurality of receive antennas using said extracted reference signal components.

4. The method according to claim 3, further comprising determining signal quality information of said generated RAKE-based equivalent single path signal and said generated equalizer-based equivalent single path signal, respectively, based on said determined noise components.

5. The method according to claim 4, further comprising selecting said generated RAKE-based equivalent single path signal or said generated equalizer-based equivalent single path signal for channel decoding based on said corresponding determined signal quality information.

6. The method according to claim 5, further comprising diversity processing said despreaded, selected RAKE-based equivalent single path signal or said despreaded selected equalizer-based equivalent single path signal.

7. The method according to claim 6, further comprising combining signal components, transmitted from said plurality of transmit antennas located on said single base station, in said despreaded selected RAKE-based equivalent single path signal or said despreaded selected equalizer-based equivalent single path signal.

8. The method according to claim 6, further comprising combining signal components, received from said plurality of receive antennas on said mobile communication device, in said despreaded selected RAKE-based equivalent single path signal or said despreaded selected equalizer-based equivalent single path signal.

9. The method according to claim 6, further comprising determining transmission parameters for said diversity processed equivalent single path signal.

10. The method according to claim 9, further comprising channel decoding said diversity processed equivalent single path signal using said determined transmission parameters.

11. A system for signal processing for use within a mobile communication device comprising a plurality of receive antennas, the system comprising:

a receiver configured to receive spatially independent multipath signals via said plurality of receive antennas from a plurality of transmit antennas located on a single base station; and a processor and/or circuits configured to:

concurrently generate a RAKE-based equivalent single path signal and an equalizer-based equivalent single path signal for said spatially independent multipath signals received by each of said plurality of receive antennas;

select one of said generated RAKE-based equivalent single path signal and said generated equalizer-based equivalent single path signal with respect to said each of said plurality of receive antennas for channel decoding; and despread said selected RAKE-based equivalent single path signal or said selected equalizer-based equivalent single path signal.

12. The system according to claim 11, wherein said processor and/or circuits are further configured to extract reference signal components from said spatially independent multipath signals received by each of said plurality of receive antennas.

13. The system according to claim 12, wherein said processor and/or circuits are further configured to determine noise components in said spatially independent multipath signals received by each of said plurality of receive antennas using said extracted reference signal components.

14. The system according to claim 13, wherein said processor and/or circuits are further configured to determine signal quality information of said generated RAKE-based equivalent single path signal and said generated equalizer-based equivalent single path signal, based on said determined noise components.

15. The system according to claim 14, wherein said processor and/or circuits are further configured to select said generated RAKE-based equivalent single path signal or said generated equalizer-based equivalent single path signal for channel decoding based on said corresponding determined signal quality information.

16. The system according to claim 15, wherein said processor and/or circuits are further configured to diversity process said despreaded selected RAKE-based equivalent single path signal or said despreaded selected equalizer-based equivalent single path signal.

17. The system according to claim 16, wherein said processor and/or circuits are further configured to combine signal components, transmitted from said plurality of transmit antennas located on said single base station, in said despreaded selected RAKE based equivalent single path signal or said despreaded selected equalizer-based equivalent single path signal.

18. The system according to claim 16, wherein said processor and/or circuits are further configured to combine signal components, received from said plurality of receive antennas on said mobile communication device, in said despreaded selected RAKE-based equivalent single path signal or said despreaded selected equalizer-based equivalent single path signal.

19. The system according to claim 16, wherein said processor and/or circuits are further configured to determine transmission parameters for said diversity processed equivalent single path signal.

20. The system according to claim 19, wherein said processor and/or circuits are further configured to channel decode said diversity processed equivalent single path signal using said determined transmission parameters.

* * * * *